(12) United States Patent
Poledna

(10) Patent No.: US 10,394,669 B2
(45) Date of Patent: Aug. 27, 2019

(54) TIME-TRIGGERED PROCESS FOR THE PERIODIC FAULT-TOLERANT TRANSMISSION OF REAL-TIME DATA IN A DISTRIBUTED COMPUTER SYSTEM

(71) Applicant: FTS Computertechnik GmbH, Vienna (AT)

(72) Inventor: Stefan Poledna, Klosterneuburg (AT)

(73) Assignee: TTTech Computertechnik AG, Vienna (AT)

( * ) Notice: Subject to any disclaimer, the term of this patent is extended or adjusted under 35 U.S.C. 154(b) by 93 days.

(21) Appl. No.: 15/293,894

(22) Filed: Oct. 14, 2016

(65) Prior Publication Data

US 2017/0111140 A1    Apr. 20, 2017

(30) Foreign Application Priority Data

Oct. 16, 2015   (AT) .................................. 50884/2015

(51) Int. Cl.
*G06F 11/00*    (2006.01)
*G06F 11/16*    (2006.01)
(Continued)

(52) U.S. Cl.
CPC ...... *G06F 11/1625* (2013.01); *G06F 11/1004* (2013.01); *H04L 1/0041* (2013.01);
(Continued)

(58) Field of Classification Search
CPC ........... H04L 49/55–557; H04L 1/0041; G06F 11/004; G06F 11/1004; G06F 11/16–1654; G06F 1/14
See application file for complete search history.

(56) References Cited

U.S. PATENT DOCUMENTS

| 2005/0041653 | A1* | 2/2005 | Arnold | .................... H04L 45/00 370/383 |
| 2010/0183016 | A1* | 7/2010 | Bonk | ....................... G06F 1/14 370/400 |

(Continued)

OTHER PUBLICATIONS

Kopetz, "Fault Containment and Error Detection in the Time-Triggered Architecture", 2003, Proceedings of the Sixth International Symposium on Autonomous Decentralized System (ISADS'03), 8 pages (Year: 2003).*

(Continued)

*Primary Examiner* — Michael Maskulinski
(74) *Attorney, Agent, or Firm* — Eversheds Sutherland (US) LLP

(57) ABSTRACT

The invention relates to a method for periodic transmission of real time data in a computer system, particularly a distributed computer system, which computer system is comprised of node computers (201-208), particularly an appreciable number of node computers (201-208), and distributor units (211-215), particularly an appreciable number of distributor units (211-215), wherein the node computers (201-208) and the distributor units (211-215) have access to a global time, and wherein real time data are transmitted by means of time-triggered real time messages, wherein selected distributor units (212, 213, 214, 215) form a central structure of distributor units; and wherein during a periodic communication round (PCR), in the error-free case, at least two copies of each real time message to be sent are transmitted via at least two independent routes through the central structure, by executing a satisfying or an optimal time plan, from a start distributor unit in the central structure to a target distributor unit in the central structure; such that in the error case, error handling can begin immediately after an error detection time point contained in the time plan, preferably in the optimal time plan.

13 Claims, 2 Drawing Sheets

(51) Int. Cl.
   *H04L 1/00*   (2006.01)
   *H04L 1/08*   (2006.01)
   *H04L 1/18*   (2006.01)
   *G06F 11/10*  (2006.01)
   *H04L 29/08*  (2006.01)
   *H04L 1/06*   (2006.01)

(52) U.S. Cl.
   CPC .............. *H04L 1/0061* (2013.01); *H04L 1/06* (2013.01); *H04L 1/08* (2013.01); *H04L 1/189* (2013.01); *H04L 67/10* (2013.01); *H04L 2001/0092* (2013.01)

(56) References Cited

U.S. PATENT DOCUMENTS

2012/0027022 A1*  2/2012  Birkedahl ........... H04L 12/4641
                                                      370/401
2015/0063362 A1*  3/2015  Poledna ................ H04J 3/0673
                                                      370/400
2015/0078205 A1*  3/2015  Stoger ..................... H04L 45/02
                                                      370/255

OTHER PUBLICATIONS

Kopetz et al., "TTP—A Time-Triggered Protocol for Fault-Tolerant Real-Time Systems", 1993, IEEE, pp. 524-533 (Year: 1993).*
Leen et al., "TTCAN: A new time-triggered controller area network", 2002, Microprocessors and Microsystems 26 (2002), Elsevier Science B.V., pp. 77-94 (Year: 2002).*
Steinhammer et al., "A Time-Triggered Ethernet (TTE) Switch", 2006, EDAA, pp. 794-799 (Year: 2006).*
Heiner et al., "Time-Triggered Architecture for Safety-Related Distributed Real-Time Systems in Transportation Systems", 1998, IEEE, 6 pages (Year: 1998).*
Kopetz et al., "The Time-Triggered Ethernet (TTE) Design", May 18-20, 2005, IEEE, Eighth IEEE International Symposium on Object-Oriented Real-Time Distributed Computing (ISORC '05) (Year: 2005).*
Bisson, Ken, "SAE AS6802 Deterministic Ethernet Network Solution", Mar. 2011, Avionics Interface Technologies, pp. 1-20 (Year: 2011).*

\* cited by examiner

TIME-TRIGGERED PROCESS FOR THE PERIODIC FAULT-TOLERANT TRANSMISSION OF REAL-TIME DATA IN A DISTRIBUTED COMPUTER SYSTEM

The invention relates to a method, particularly a fault-tolerant method, particularly a time-triggered fault-tolerant method, for periodic transmission of real time data in a computer system, particularly a distributed computer system, which computer system is comprised of node computers, particularly an appreciable number of node computers, and distributor units, particularly an appreciable number of distributor units, wherein the node computers and the distributor units have access to a global time, and wherein real time data are transmitted by means of time-triggered real time messages.

Further, the invention relates to a computer system, particularly a distributed computer system, which computer system is comprised of node computers, particularly an appreciable number of node computers, and distributor units, particularly an appreciable number of distributor units, wherein the node computers and the distributor units have access to a global time, and wherein real time data are transmitted by means of time-triggered real time messages.

In many real time systems, particular in the area of control engineering, period processes are realized (Ref. 6). In a distributed real time computer system, a timewise repeating period process segment is designated a "frame".

In a distributed real time computer system, a frame begins with the synchronized monitoring ("observation") of a technical process by, e.g., spatially distributed sensors, in order to record the state of the technical process at a predetermined time point.

Preferably, each sensor is associated with a node computer, with the sensor and the node computer being designed as separate component units which can be interconnected, or else the sensor and the node computer are designed as a single component unit (so-called intelligent sensor).

The data from a technical process can only be recorded synchronously if all of the node computers, which as a rule are de-centrally disposed, have access to a global time. For example, the internal clock synchronization contained in the time-triggered TTEthernet protocol (Ref. 4) can be used to establish a global time in all components of a distributed real-time system, in particular a distributed real-time computer system. Since it is possible to set the internal Ethernet time with an external time standard, e.g. GPS, the Ethernet time can also take over the synchronization of the sensors if and when external synchronization is required.

The node computers combined with or associated with the respective sensors, or the intelligent sensors, carry out a first preliminary processing of the sensor data, and they send the preliminarily processed sensor data, preferably in a periodically recurring time slot, via a real time communication system, preferably immediately, to a central node computer, which, e.g., carries out a corresponding control algorithm. Then the central node computer sends set point values calculated from the sensor data to (other) node computers which are spatially distributed in the typical fashion, which latter node computers carry out the control functions via actuators, so as to transmit the set point values to the process, at a synchronized time point. If the frame has a short duration, this helps to keep the dead time of the overall control system short, and thereby to improve the quality of the control.

An underlying problem of the present invention was to devise a solution which provides rapid and fault-tolerant transmission of real time data in a real time system, particularly a distributed time-triggered real time system (or a real time computer system, particularly a distributed time-triggered real time computer system).

This problem is solved by a method of the general type described above, and a computer system of the general type described above, wherein, according to the invention, selected distributor units form a central structure of distributor units; and wherein during a periodic communication round (PCR), in the error-free case, at least two copies of each real time message to be sent are transmitted via at least two independent routes through the central structure, by executing a satisfying or an optimal time plan, from a start distributor unit in the central structure to a target distributor unit in the central structure; such that in the error case, error handling can begin immediately after an error detection time point contained in the time plan, preferably in the optimal time plan.

The computer system is preferably a distributed real time computer system.

Certain terms are used in this description which will now be described:

"Error case": The following Table sets forth differences between the error case (or anomaly case) and the correct case. The acronym "CRC" stands for "cyclic redundancy check", which is preferably carried out.

| Scenario: | Characterization: | Evaluation: | Action: |
|---|---|---|---|
| Two messages are received: | CRC Check shows both messages okay. Contents are the same. | Correct. | Transmission of one message. |
| Two messages are received: | Check [sic -- i.e. CRC Check] shows both messages okay. Contents are not the same. | Error case. | Error report. |
| Two messages are received: | CRC Check shows one message is okay. CRC Check of the second message shows it is not okay. | Anomaly. | Transmission of the message with correct CRC. Anomaly report. |
| Two messages are received: | CRC Check shows neither of the two messages okay. | Error case. | Error report. |
| One message is received: | CRC Check shows okay. | Anomaly. | Transmission of the message. Anomaly report. |
| One message is received: | CRC Check shows not okay. | Error case. | Error report. |
| No message is received prior to the deadline. | | Error case. | Error report. |

Error handling: The error handling depends on the given application. E.g. if an error case is detected in a system with a robot, the preferred error handling will involve, first, stopping the robot, so that, e.g., damage cannot occur due to uncontrolled movements.

Real time message: A message which contains real time data, and which is to be received by a recipient within a prescribed real time interval.

Central structure of distributor units: A communications topology which is characterized in that distributor units represent nodes in a graph, and paths represent connections between the nodes, in pairs, for transmission of real time data and/or real time messages, wherein each distributor unit of the central structure can be reached via at least two independent routes (see further discussion below).

Selected distributor unit: A distributor unit which is contained in the central structure.

Start distributor unit: A selected distributor unit which receives real time data from one or more of the node computers associated with said selected distributor unit, for transmission through the central structure of distributor units.

Target distributor unit: A selected distributor unit which forwards real time data which it has received via the central structure of distributor units, to one or more of the node computers associated with said selected distributor unit.

Independent routes: Two routes from a start distributor unit to a target distributor unit through a central structure of distributor units are independent if there is no common path in the routes from the start distributor unit to the target distributor unit.

Periodic communication round (PCR): A periodic interval determined by a time plan, during which interval each start distributor unit transmits the real time data received prior to the start of said period interval from the associated node computers, to the target distributor units.

Optimal time plan: A present time plan which governs the time-triggered transmission of real time data via a central structure of distributor units within a PCR is optimal if there is no time plan which realizes the message exchange under the given constraints ("boundary conditions") in a shorter time than said plan.

Satisficying time plan: A time plan which governs the time-triggered transmission of real time data via a central structure of distributor units within a PCR is a satisfying time plan if the message exchange under the given constraints ("boundary conditions") takes place satisfactorily but the time plan is not optimal. Preferably, in the context of the present invention, a "satisfying time plan" will be understood to mean a time plan which carries out the message exchange under the given constraints ("boundary conditions") within a time period which exceeds the time period which an optimal time plan would require under these constraints, by not more than 50%.

Error detection time point: The earliest time point at which an "error case" (see above) in the message transmission can be detected.

With the invention, it is possible to very rapidly determine that an error has occurred, particularly when an "optimal time plan" is being employed, and "error handling" can then be begun correspondingly rapidly.

In the present invention, a method and a computer system are proposed which enable the duration of periodic fault-tolerant data transmission of real time data to be minimized, in order to reduce the total time (total response time) of a control system.

Starting from a given topology of a central structure of distributor units, a time plan is developed which minimizes the time for periodic fault-tolerant transmission of real time data, and achieves a short error detection latency.

Advantageous refinements of the inventive method and the inventive computer system, which can be realized individually or in various combinations, are described below:

Following the end of a periodic communication round, those distributor units which have participated in that periodic communication round send a copy of the (preferably correct—see above) real time messages received during said periodic communication round to the node computers associated with the respective distributor units;

After the end of a periodic communication round, the distributor units report errors which were detected during said periodic communication round, to a monitor node computer;

Messages, particularly real time messages, are transmitted in the central structure of distributor units with the use of the TTEthernet protocol;

A start distributor unit transmits the real time data in a PCR to each distributor unit in the central structure. Accordingly, all of the other distributor units in the central structure form the target distributor units for this start distributor unit;

All of the distributor units in the central structure function as start distributor units, which, in a PCR, transmit real time messages to target distributor units, preferably to all other selected distributor units in the central structure;

A node computer is connected to two or more selected distributor units of the central structure of distributor units.

The startup and maintenance of a distributed real time system is made substantially easier if the input and output data of each node computer can be observed in a non-reactive manner, from an independent monitor. Accordingly, it is advantageous if the real time communication system which [handles] the data exchanged between the node computers also has a monitor available.

The invention will be described in more detail with reference to the drawings, with reference to an example.

Figure 1:
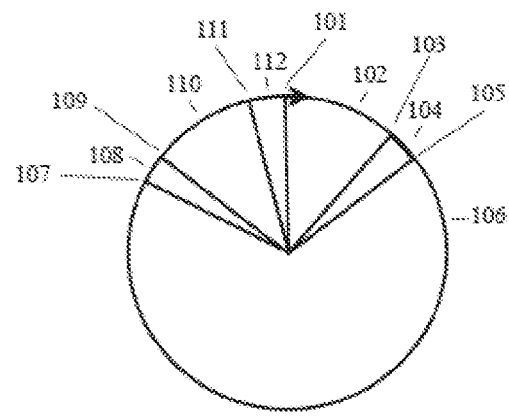
FIG. 1 illustrates the timewise course of events within a frame.

FIG. 1 illustrates the timewise course of events within a frame. A frame begins at a synchronized point in time 101. At this time 101, sensors associated with the node computers collect the data of a technical process. In the time interval 102, the collected data are pre-processed, and a node computer sends the data to the start distributor unit which is associated with said node computer.

In this connection, preferably each node computer sends data to its start distributor unit, in each periodic communication round (PCR).

A PCR begins at the synchronized time point 103, and ends after a period 104 at time point 105, which is the time point of transfer of data to the target distributor unit. In the time interval 106 between the time points 105 and 107, a control algorithm is carried out in a central node computer, wherewith set point values are determined and are transmitted to the corresponding start distributor units.

In the time interval 108 between time points 107 and 109, i.e. in the interval 108, a second PCR takes place, for transmitting the set point values to node computers which control the actuators. In the time interval 110, the set point values received by the node computers associated with the actuators are converted into concrete parameters for the actuators, and at time point 111 the actuators are themselves actuated.

Figure 2:
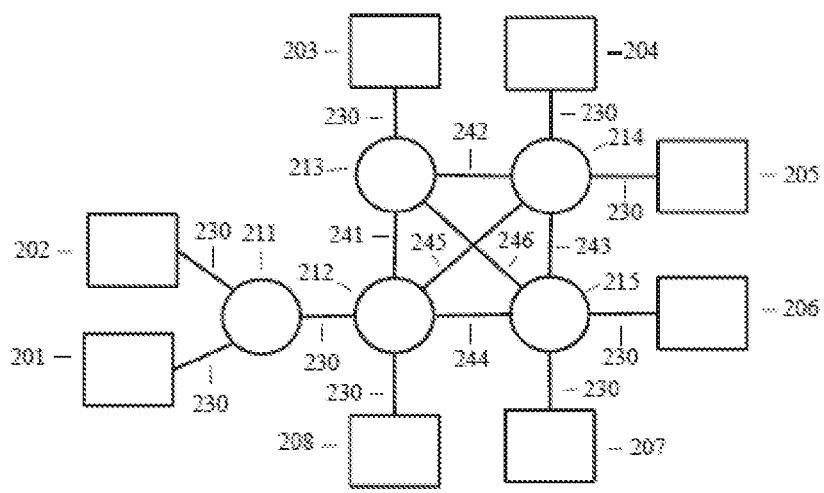
FIG. 2 illustrates the topology of a distributed real time system, particularly a real time computer system.

FIG. 2 illustrates the topology of a distributed computer system. In FIG. 2, eight node computers (201, 202, 203, 204, 205, 206, 207, and 208) are connected by distributor units (211, 212, 213, 214, and 215). The distributor units (212, 213, 214, and 215) are selected distributor units which form a central structure of distributor units. The lines 230 in FIG. 2 represent the connecting paths within the central structure.

All of the node computers and distributor units have access to a fault-tolerant global time of known precision.

Prior to the synchronized start of a PCR, the start distributor units (212, 213, 214, and 215) which are disposed in the central structure receive the real time data which are to be transported in the given PCR, from the node computers associated with said start distributor units; in particular: the selected distributor unit 212 receives real time data from the node computer 208 and (via the not selected distributor unit 211) real time data from the node computers 201 and 202; the selected distributor unit 213 receives real time data from the node computer 203; the selected distributor unit 214 receives real time data from the node computers 204 and 205; and the selected distributor unit 215 receives real time data from the node computers 206 and 207.

Preferably, each PCR is divided into a plurality of phases. In each such phase, each selected distributor unit sends real time data corresponding to a prior established satisfying or optimal time plan, to the immediately neighboring selected distributor units, by means of real time messages via the available bidirectional paths. The number of phases needed in a PCR such that each target distributor unit receives at least two copies of each real time message (in the error-free case) depends on the topology of the central structure of the distributor units.

Preferably, it is provided that a start distributor unit sends [lit., "send"] real time data and/or real time messages to all other distributor units in the central structure which together are the target distributor units for the said start distributor unit.

In the concrete example according to FIG. 2, at the start of the first phase of a PCR, each of the start distributor units starts to send the real time data received from the associated node computers prior to the start of said PCR, to the target distributor units. In Tables 1 and 2, which relate to the situation illustrated in FIG. 2, the real time data which are to be sent from a start distributor unit to the target distributor units are designated with the letter E, followed by the number of the start distributor unit; further, "VE" means "Distributor unit", and "Sent via" followed by a number nnn refers to sending via the path nnn.

If each selected distributor unit is connected to each other selected distributor unit via connection paths as illustrated in FIG. 2, then at the end of the first phase a copy of the real time data will have been received in each target distributor unit.

TABLE 1

Real time data transmission in phase 1 of the PCR (periodic communication round) according to FIG. 2.

|  | To VE: | | | |
|---|---|---|---|---|
| From VE | 212 | 213 | 214 | 215 |
| 212 sends via: | — | 241 | 245 | 244 |
| Real time data: |  | E212 | E212 | E212 |
| 213 sends via: | 241 | — | 242 | 246 |
| Real time data: | E213 |  | E213 | E213 |
| 214 sends via: | 245 | 242 | — | 243 |
| Real time data: | E215 | E213 |  | E213 |
| 215 sends via: | 244 | 246 | 243 | — |
| Real time data: | E215 | E215 | E215 |  |

KEY:
VE = Distributor unit: Sends via = sends via the connecting path nnn (where the connecting path number nnn represents 241, 242, 243, 244, 245, or 246);
Eppp = Start distributor unit ppp (where the number ppp represents 212, 213, 214, or 215).

In the second phase, the following real time data transmission takes place:

TABLE 2

Real time data transmission in phase 2 of the PCR (periodic communication round) according to FIG. 2.

|  | To VE: | | | |
|---|---|---|---|---|
| From VE | 212 | 213 | 214 | 215 |
| 212 sends via: | — | 241 | 245 | 244 |
| Real time data: |  | E212 | E212 | E212 |
| 213 sends via: | 241 | — | 242 | 246 |
| Real time data: | E213 |  | E213 | E213 |
| 214 sends via: | 245 | 242 | — | 243 |
| Real time data: | E215 | E213 |  | E213 |
| 215 sends via: | 244 | 246 | 243 | — |
| Real time data: | E215 | E215 | E215 |  |

KEY:
(Same as for Table 1.)

It is seen from Tables 1 and 2 that at the end of the second phase of the PCR two copies of the real time data have been received by each target distributor unit, which real time data have been transmitted by different, independent routes. The time plan proposed here is optimal, because it is not possible to send the messages redundantly from the start distributor units to the target distributor units, in a given phase.

After the end of the PCR, the target distributor units send a copy of the received real time data to the associated node computers.

If the crossing paths 245 and 246 in FIG. 2 are removed, then at least three phases will be needed in order to meet the posed requirements.

Immediately after the last phase of the time-triggered message transmission has ended, each target distributor unit, at the a priori determined error detection time point, can determine whether an error arose in the message transmission, whereby a short error detection latency can be realized. A short error detection latency is particularly important in fail-safe applications.

Figure 3:
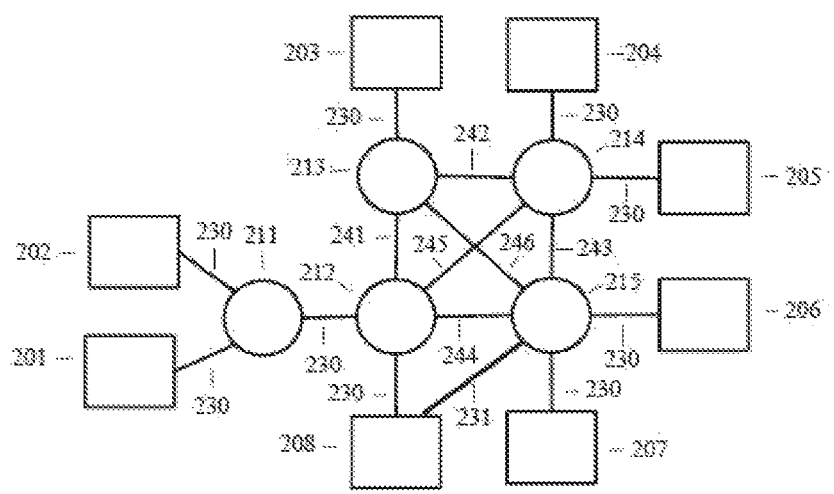
FIG. 3 illustrates the topology of the distributed real time system, which is particularly a real time computer system, with redundant coupling of a node computer.

FIG. 3 illustrates a modification of the computer system according to FIG. 2. In FIG. 3, the node computer 208 is also connected to the selected distributor unit 215 via an additional path 231. By means of this connection of the node computer 208 via path 231 to a second independent selected distributor unit according to FIG. 3, the failure of a selected distributor unit can be tolerated, which is important for fail-operational applications.

It is advantageous to carry out the transmission of the time-triggered messages, particularly the time-triggered real time messages which transmit the real time data, during a PCR, with use of the TTEthernet protocol. In this way, e.g., the interval between the PRCs can be used to transmit event-driven Ethernet messages.

Further, it may be provided that the distributor units report errors which are detected during a PCR to a monitor node computer, after the end of a [(the)] PCR.

CITED LITERATURE (1) U.S. Pat. No. 9,063,837. Bauer et al. Method and device for fault-tolerant, time-triggered real-time communication, granted 23 Jun. 2015.
(2) U.S. Pat. No. 7,848,361. Ungermann et al. Time-triggered communication system and method for the synchronization of a dual-channel network, granted 7 Dec. 2010.

(3) U.S. Pat. No. 7,548,551. System and method of optimizing the bandwidth of a time triggered communication protocol with homogeneous slot sizes, granted 16 Jun. 2009

(4) SAE Standard AS6802 for TTEthernet. URL: http://standards.sae.org/as6802.

(5) Kopetz, H. *Real-time Systems—Design Principles for Distributed Embedded Applications*, Springer Verlag, 2011.

(6) Kopetz, H. *Pulsed Data Streams*. In: *From Model Driven Design to Resource Management for Distributed Embedded Systems*, Ed.: B. Kleinjohann et al., IFIP Series, Vol. 225, pp. 105-114. Springer Verlag. 2006.

The invention claimed is:

1. A time-triggered fault-tolerant method for periodic transmission of real time data in a distributed computer system, which distributed computer system is comprised of a plurality of node computers (201-208) and a plurality of distributor units (211-215), wherein the node computers (201-208) and the distributor units (211-215) have access to a global time, and wherein real time data are transmitted by time-triggered real time messages, the method comprising:
   selecting distributor units (212, 213, 214, 215) to form a central structure of distributor units; and
   transmitting during a periodic communication round (PCR), in an error-free case, at least two copies of each of the time-triggered real time messages to be sent via at least two independent routes through the central structure, by executing a satisfactory or optimal time plan, from a start distributor unit in the central structure to a target distributor unit in the central structure such that in an error case, error handling begins immediately after an error detection time point contained in the satisfactory or optimal time plan.

2. The method according to claim 1, wherein after an end of a periodic communication round, those distributor units which have participated in this periodic communication round send a copy of the time-triggered real time messages which have been received during this periodic communication round, which time-triggered real time messages are correct, to the node computers associated with the respective distributor unit.

3. The method according to claim 1, wherein after an end of a periodic communication round, the distributor units report errors which have been detected during the periodic communication round to a monitor node computer.

4. The method according to claim 1, wherein the transmission of time-triggered real time messages in the central structure of distributor units is carried out with use of TTEthernet protocol.

5. The method according to claim 1, wherein the start distributor unit transmits the real time data in a PCR to each distributor unit in the central structure.

6. The method according to claim 1, wherein all distributor units in the central structure function as respective start distributor units, which in a PCR transmit time-triggered real time messages to target distributor units comprising all other selected distributor units in the central structure.

7. A distributed computer system, comprising:
   a plurality of node computers (201-208); and
   a plurality of distributor units (211-215), wherein the node computers (201-208) and the distributor units (211-215) have access to a global time, and wherein real time data are transmitted by time-triggered real time messages,
   wherein selected distributor units (212, 213, 214, 215) form a central structure of distributor units, and
   wherein during a periodic communication round (PCR), in the error-free case, at least two copies of each time-triggered real time message to be sent are transmitted via at least two independent routes through the central structure, by executing a satisfactory or optimal time plan, from a start distributor unit in the central structure to a target distributor unit in the central structure such that in the error case, error handling begins immediately after an error detection time point contained in the satisfactory or optimal time plan.

8. The system according to claim 7, wherein after an end of a periodic communication round, those distributor units which have participated in this periodic communication round send a copy of the time-triggered real time messages which have been received during this periodic communication round, which time-triggered real time messages are correct, to the node computers associated with the respective distributor unit.

9. The system according to claim 7, wherein after an end of a periodic communication round, the distributor units are configured to report errors which have been detected during the periodic communication round to a monitor node computer.

10. The system according to claim 7, wherein the transmission of time-triggered real time messages in the central structure of distributor units is configured to be carried out with use of TTEthernet protocol.

11. The system according to claim 7, wherein the start distributor unit is configured to transmit the real time data in a PCR to each distributor unit in the central structure.

12. The system according to claim 7, wherein ail distributor units in the central structure are configured to function as respective start distributor units, which in a PCR transmit time-triggered real time messages to target distributor units comprising all other selected distributor units in the central structure.

13. The system according to claim 7, wherein a node computer (208) with two or more selected distributor units (212, 215) is connected to the central structure of distributor units.

* * * * *